Dec. 13, 1938.   R. A. WEINHARDT   2,139,921

SNAP ACTING THERMOSTAT

Filed June 7, 1938

INVENTOR.
Robert A. Weinhardt
BY Barnes, Kisselle, Laughlin & Raisch
ATTORNEYS

Patented Dec. 13, 1938

2,139,921

UNITED STATES PATENT OFFICE 2,139,921

SNAP ACTING THERMOSTAT

Robert A. Weinhardt, Detroit, Mich., assignor to W. M. Chace Company, Detroit, Mich., a corporation of Michigan Application June 7, 1938, Serial No. 212,319

19 Claims. (Cl. 200—138)

This invention relates to a snap acting thermostat.

A thermostat fabricated from thermoflex material, such, for example, as bimetal, changes its shape as the temperature changes owing to the internal stresses set up in the thermoflex material by such temperature change. Such a thermostat is slow acting and particularly undesirable for making and breaking an electrical circuit because of arcing of the electrical current between the contacts. To obtain a quick or snap acting thermostat, it has been proposed to utilize a strip of thermoflex material which is initially bowed or held under stress so that as the temperature changes it will suddenly reverse its curvature upon reaching a predetermined temperature. After the predetermined temperature is reached, the action of this kind of thermostat is a quick or snap action because the stress set up in the metal upon reaching a certain value expends itself by quickly reversing the curvature of the strip. However, prior to reaching this predetermined temperature the thermostatic bowed strip changes its shape as the temperature changes. Such changing of shape is gradual rather than abrupt or snap acting. Thus, even when the thermoflex material is stressed and held in the form of a bowed or curved strip, the snap-action is obtained only at the end, but not at the beginning, of each cycle wherein the strip reverses its curvature.

It is an object of this invention to produce a thermostat which will overcome this above-noted defect in this type of thermostat by compensating for the gradual action of the bowed thermoflex strip at the beginning of the cycle wherein reversal of the curvature takes place and thus produce a thermostat with a snap action both when a predetermined temperature is reached upon a rise in temperature as well as when a predetermined temperature is reached upon a fall in temperature.

It is an object of this invention to produce a snap acting thermostatic switch of simple structure which has a snap action both for the making and breaking of the electrical circuit during the operation of the thermostatic switch to thereby avoid arcing at, and pitting of, the contacts.

Figure 1:
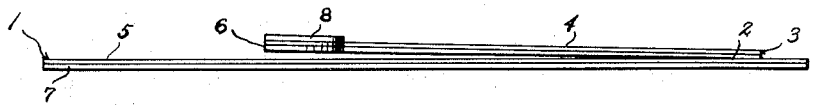
Fig. 1 is a side elevation showing the thermostatic composite metal element per se.

For descriptive purposes only, and not by way of limitation, the thermostat which is the subject of this invention is shown for controlling the making and breaking of an electrical contact.

The thermostatic metal element may comprise any desirable number of laminae but preferably and for descriptive purposes comprises bimetal. As shown the thermostatic metal element comprises a bimetal strip 1 which has welded or otherwise fixed thereto as at 2 a bimetal strip 3 of shorter length. The strips 1 and 3 are normally flat strips of thermostatic bimetal each comprising lamina having different coefficients of expansion. The lamina 4 of the strip 3 having the lower coefficient of expansion and the lamina 5 of the strip 1 having the lower coefficient of expansion are positioned on the top sides respectively of strips 3 and 1 whereas the lamina 6 of the strip 3 having the higher coefficient of expansion and the lamina 7 of the strip 1 having the higher coefficient of expansion are positioned on the bottom sides respectively of strips 3 and 1. The strip 3 has welded or otherwise secured thereto the platinum contact surface 8.

The bimetal element constructed as above described is mounted in any suitable support. For descriptive purposes this support takes the form of a U shaped metal bracket 9 provided with opposed notches 10 in the leg portions 11. The distance between the notched legs 11 is somewhat less than the length of the strip 1 when in its normal flat condition, as illustrated in Fig. 1. Thus, when the strip 1 is mounted upon the bracket 9 with its ends interengaging the legs 11 in the notches 10, the bimetal strip 1 will be placed under stress and assume an arched condition of the approximate curvature illustrated in Fig. 2.

Figures 2, 3:
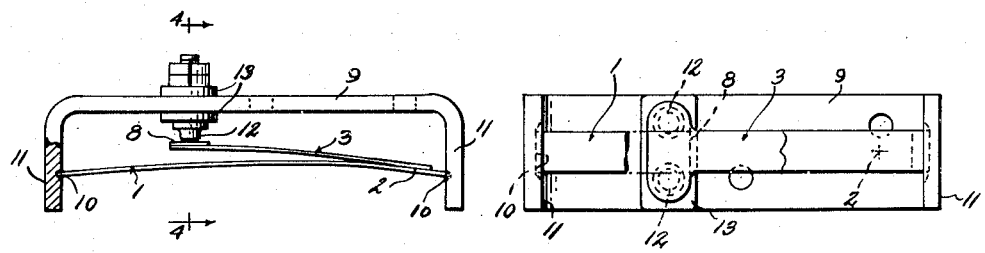
Fig. 2 is a side elevation of the snap acting switch with the electrical circuit closed.
Fig. 3 is a bottom plan view of the snap acting switch.

The bimetal element is secured in the bracket 9, as illustrated in Fig. 2, so that the low expanding laminae 4 and 5 are positioned on the top side, as shown in Fig. 1, that is, the low expanding side 5 is on the outside of the curvature of the strip 1.

Figure 4:
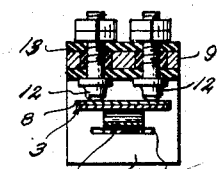
Fig. 4 is a section along the line 4—4 of Fig. 2.

A pair of contacts 12 are mounted on the bracket 9 and insulated therefrom by the insulation 13 (Fig. 4). The particular composition of the bimetal strips 1 and 3 will vary with the temperature conditions under which the thermostatic switch is designed to operate and since the compositions of these bimetals for operating under various temperatures is old and well known, the composition of the bimetal elements will not be described, suffice it to say that any suitable well-known thermostatic bi or plural laminae metal can be used for the strips 1 and 3.

When the bimetal element is mounted in the bracket 9, as indicated in Fig. 2, and the temperature of the surrounding atmosphere is below the predetermined temperature at which the thermostatic switch is designed to break the electrical circuit, the strip 1 will assume the curvature indicated which throws the contact 8 into contact with the contacts 12 to close the electrical circuit. At this time the strip 3 is approximately tangent to the curve assumed by the strip 1 at the point at which the strip 3 is fixed to the strip 1. Preferably also the strip 3 is stressed slightly between the contacts 12 and its point of securement to the strip 1.

Figure 5:
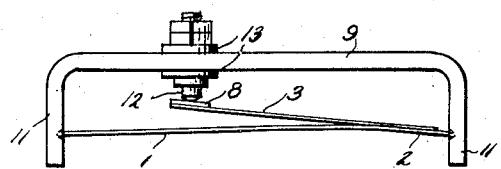
Fig. 5 is a side elevation of the switch showing the approximate position of the thermostatic composite metal elements following a rise in temperature just before the snap action occurs to break the contact.

As the temperature rises the high expanding lamina 7 of the strip 1 expands faster than the low expanding lamina 5 and thus causes the strip 1 to flatten out, so to speak, or assume a somewhat undulating or compound curve shape as indicated in Fig. 5. As the temperature rises the strip 1 tends to lose its simple curvature and flatten out and tends to draw the strip 3 and contact 8 away from the contacts 12 but strip 4 tends to curve upwardly and maintain the contact 8 in contact with the contacts 12. The upward curvature of the strip 4 is occasioned by the fact that the high expanding lamina 6 is positioned on the underside of the member 3 which thus upon a rise of temperature curves the strip 4 upwardly.

Figure 6:
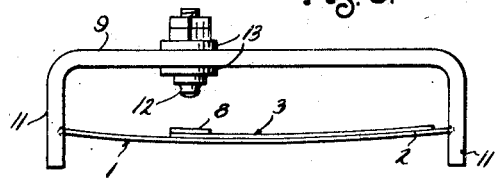
Fig. 6 is a side elevation after the snap action occurs to break the contact.

As the temperature continues to rise the strip 1 finally reaches center position at which time strip 3 still holds contact 8 in contact with the contacts 12 and then the strip 1 reverses its curvature with a snap action and thus abruptly draws the strip 3 to the position indicated in Fig. 6 and abruptly breaks the contact 8 from the contacts 12 without arcing. As shown in Fig. 6, while the strip 1 remains reversely curved, the strip 3 is drawn inwardly against the then concave or inside curved face of the strip 1.

As the temperature of the surrounding atmosphere falls the strip 1 tends to move upwardly toward center, that is, flatten out, so to speak, or assume an undulating position, reaches center position and then snaps above center again making the contact with the snap action and returning the thermostatic bimetal switch to the position shown in Fig. 2.

Figure 7:
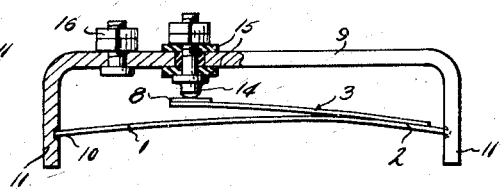
Fig. 7 is a side elevation of a modified form of snap acting switch.
Figure 8:
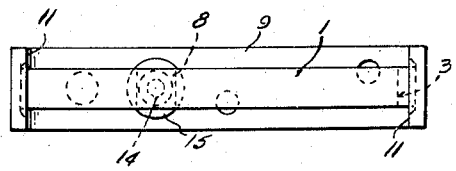
Fig. 8 is a bottom plan view of the modified form of switch shown in Fig. 7.

The switch in Figs. 7 and 8 is identical with that shown in the preceding forms except that the bracket 9 is provided with a single contact 14 which is insulated from the bracket by insulation 15. In this form the bracket 9 and bimetal 1, 3 forms a part of the electrical circuit. The contact 14 is connected with one of the electrical leads and the bracket 9 is connected with the other electrical lead through connection 16.

Figure 9:
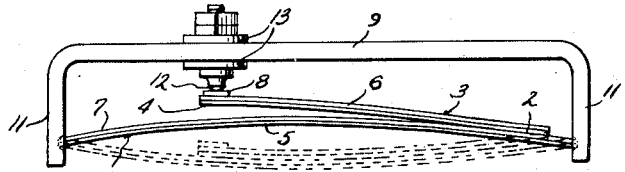
Fig. 9 is a side elevation of a thermostatic switch wherein the electrical contact is broken following a drop in temperature.

In Fig. 9 the thermostat is identical with that shown in Figs. 1 through 6 except that the bimetal strips 1 and 3 have been reversed so that the contact is broken when a drop in temperature occurs. This is achieved by arranging the bimetal strip 1 so that the lamina 7 having the higher coefficient of expansion is on the outside of the curve and the lamina 5 having the lower coefficient of expansion is on the inner side of the curve, as shown in Fig. 9. Strip 3 is arranged so that the lamina 4 having the lower coefficient of expansion is located on the underside of the strip and adjacent the high expanding lamina 7 of strip 1. The high expanding lamina 6 of the strip 3 is positioned on the upper side of the strip 3.

When the bimetal element is mounted in the bracket 9, as indicated in Fig. 9, and the temperature of the surrounding atmosphere is above the predetermined temperature at which the thermostatic switch is designed to break the electrical circuit, the strip 1 will assume the curvature indicated which throws the contact 8 into contact with the contacts 12 to close the electrical circuit.

As the temperature drops the high expanding lamina 7 of the strip 1 contracts faster than the low expanding lamina 5 and thus causes the strip 1 to flatten out or assume a somewhat undulating or compound curve shape. As the strip 1 flattens out it tends to draw the strip 3 and contact 8 away from the contacts 12 but the strip 4, due to the drop in temperature, tends to curve upwardly and maintain the contact 8 in contact with the contacts 12. As the temperature continues to drop the strip 1 finally reaches center position at which time strip 3 still holds contact 8 in contact with contact 12 and then the strip 1 reverses its curvature with a snap action and thus abruptly draws the strip 3 to the position indicated in the dotted lines, Fig. 9, and abruptly breaks the contact 8 from the contacts 12 without arcing.

Upon a rise in temperature to a predetermined temperature, the reverse of this snap action occurs and the circuit is again made.

I claim:

1. A thermostatic control comprising a strip of thermostatic material consisting of a plurality of laminae having different coefficients of expansion, a support for the strip maintaining the strip arched between two spaced points, a second strip of thermostatic metal consisting of a plurality of laminae having different coefficients of expansion, said second strip being secured to said first strip and having one of its ends free, the lamina of the second strip having the higher coefficient of expansion being positioned toward the lamina of the said first strip having the lower coefficient of expansion whereby upon a rise of temperature the free end of said second strip tends to move away from the first strip until a predetermined temperature is reached whereupon the first strip abruptly reverses its curvature and draws the free end of the second strip toward the first strip.

2. A thermostatic control comprising a normally flat strip of thermostatic material consisting of a plurality of laminae having different coefficients of expansion, a support for the strip maintaining the strip arched between two spaced points, a second normally flat strip of thermostatic metal consisting of a plurality of laminae having different coefficients of expansion, said second strip being secured to said first strip and having one of its ends free, the lamina of the second strip having the higher coefficient of expansion being positioned toward the lamina of the said first strip having the lower coefficient of expansion whereby upon a rise of temperature the free end of said second strip tends to move away from the first strip until a predetermined temperature is reached whereupon the first strip abruptly reverses its curvature and draws the free end of the second strip toward the first strip.

3. A thermostatic control comprising a strip of thermostatic material consisting of a plurality of laminae having different coefficients of expansion, a support for the strip maintaining the strip arched between two spaced points, a second strip of thermostatic metal consisting of a plurality of laminae having different coefficients of expansion, said second strip being secured to said first strip approximately tangent to the above-mentioned arched strip at the point of securement and having one of its ends free, the lamina of the second strip having the higher coefficient of expansion being positioned toward the lamina of the said first strip having the lower coefficient of expansion whereby upon a rise of temperature the free end of said second strip tends to move away from the first strip until a predetermined temperature is reached whereupon the first strip abruptly reverses its curvature and draws the free end of the second strip toward the first strip.

4. A thermostatic control comprising a strip of thermostatic material consisting of a plurality of laminae having different coefficients of expansion, a support for the strip maintaining the strip arched between two spaced points, a second strip of thermostatic metal consisting of a plurality of laminae having different coefficients of expansion, said second strip being welded to said first strip adjacent one end and having its other end free, the lamina of the second strip having the higher coefficient of expansion being positioned toward the lamina of the said first strip having the lower coefficient of expansion whereby upon a rise of temperature the free end of said second strip tends to move away from the first strip until a predetermined temperature is reached whereupon the first strip abruptly reverses its curvature and draws the free end of the second strip toward the first strip.

5. A thermostatic control adapted for opening and closing an electrical circuit comprising relatively movable electrical contacts, a strip of thermostatic metal consisting of a plurality of united laminae having different coefficients of expansion, a support for the strip maintaining the strip under stress and arched between two spaced points, a second strip of thermostatic metal comprising a plurality of united laminae having different coefficients of expansion secured to said first strip and having a free end, the high expanding lamina of the second strip being positioned toward the low expanding lamina of the first strip, and a connection between one of said contacts and the free end of the second strip whereby upon a rise in temperature the free end of the second strip tends to move away from the first strip to hold the contacts together until a predetermined temperature is reached whereupon the first strip abruptly reverses its curvature and draws the free end of the second strip towards the first strip to abruptly draw the contacts apart.

6. A thermostatic control adapted for opening and closing an electrical circuit comprising relatively movable electrical contacts, a strip of thermostatic metal consisting of a plurality of united laminae having different coefficients of expansion, a support for the strip maintaining the strip under stress and arched between two spaced points with the high expanding lamina on the concave side of the arched strip, a second strip of thermostatic metal comprising a plurality of united laminae having different coefficients of expansion secured to said first strip and having a free end, the high expanding lamina of the second strip being positioned toward the low expanding lamina of the first strip, and a connection between one of said contacts and the free end of the second strip whereby upon a rise in temperature the free end of the second strip tends to move away from the first strip to hold the contacts together until a predetermined temperature is reached whereupon the first strip abruptly reverses its curvature and draws the free end of the second strip towards the first strip to abruptly draw the contacts apart.

7. A thermostatic control adapted for opening and closing an electrical circuit comprising relatively movable electrical contacts, a strip of thermostatic metal consisting of a plurality of united laminae having different coefficients of expansion, a support for the strip maintaining the strip under stress and arched between two spaced points with the high expanding lamina on the concave side of the arched strip, a second strip of thermostatic metal comprising a plurality of united laminae having different coefficients of expansion secured tangentially to said first strip and having a free end, the high expanding lamina of the second strip being positioned toward the low expanding lamina of the first strip, and a connection between one of said contacts and the free end of the second strip whereby upon a rise in temperature the free end of the second strip tends to move away from the first strip to hold the contacts together until a predetermined temperature is reached whereupon the first strip abruptly reverses its curvature and draws the free end of the second strip towards the first strip to abruptly draw the contacts apart.

8. A thermostatic control adapted for opening and closing an electrical circuit comprising relatively movable electrical contacts, a normally flat strip of thermostatic metal consisting of a plurality of united laminae having different coefficients of expansion, a support for the strip maintaining the strip under stress and arched between two spaced points, a second normally flat strip of thermostatic metal of lesser length than the first strip comprising a plurality of united laminae having different coefficients of expansion secured to said first strip and having a free end, the high expanding lamina of the second strip being positioned toward the low expanding lamina of the first strip, and a connection between one of said contacts and the free end of the second strip whereby upon a rise in temperature the free end of the second strip tends to move away from the first strip to hold the contacts together until a predetermined temperature is reached whereupon the first strip abruptly reverses its curvature and draws the free end of the second strip towards the first strip to abruptly draw the contacts apart.

9. A thermostatic control adapted for opening and closing an electrical circuit comprising relatively movable electrical contacts, a normally flat strip of thermostatic metal consisting of a plurality of united laminae having different coefficients of expansion, a support for the strip maintaining the strip under stress and arched between two spaced points, a second normally flat strip of thermostatic metal of lesser length than the first strip comprising a plurality of united laminae having different coefficients of expansion secured adjacent one end to said first strip and having the other end free, the high expanding lamina of the second strip being positioned toward the low expanding lamina of the first strip, and a connection between one of said contacts and the free end of the second strip whereby upon a rise in temperature the free end of the second strip tends to move away from the first strip to hold the contacts together until a predetermined temperature is reached whereupon the first strip abruptly reverses its curvature and draws the free end of the second strip towards the first strip to abruptly draw the contacts apart.

10. A thermostatic control comprising a strip of thermostatic metal having a plurality of united laminae with different coefficients of expansion, a support for said strip normally flexing the same in one direction for maintaining the strip in an arched condition between points spaced from one another with the high expanding lamina on the concave side of the strip as thus flexed, said support tending to resist the tendency of the strip to flatten in response to a rise in temperature until a predetermined temperature is reached whereupon the strip abruptly changes its curvature, and a second thermostatic metal strip of united laminae having different coefficients of expansion, the said second strip being secured to the first strip with the high expanding lamina adjacent the low expanding lamina of the first strip, the said second strip having a free end whereby in response to said rise in temperature the free end of the second strip tends to move away from the first strip until the first strip abruptly reverses its curvature whereby the free end of the second strip is abruptly moved toward the first strip.

11. A thermostatic control comprising a normally flat elongated strip of thermostatic metal having a plurality of united laminae with different coefficients of expansion, a support for said strip normally flexing the same in one direction for maintaining the strip in an arched condition between points spaced from one another with the high expanding lamina on the concave side of the strip as thus flexed, said support tending to resist the tendency of the strip to flatten in response to a rise in temperature until a predetermined temperature is reached whereupon the strip abruptly changes its curvature, and a second thermostatic metal normally flat elongated strip of united laminae having different coefficients of expansion, the said second strip being secured to the first strip with the high expanding lamina adjacent the low expanding lamina of the first strip, the said second strip having a free end whereby in response to said rise in temperature the free end of the second strip tends to move away from the first strip until the first strip abruptly reverses its curvature whereby the free end of the second strip is abruptly moved toward the first strip.

12. A thermostatic control comprising a strip of thermostatic metal having a plurality of united laminae with different coefficients of expansion, a support for said strip normally flexing the same in one direction for maintaining the strip in an arched condition between points spaced from one another with the high expanding lamina on the concave side of the strip as thus flexed, said support tending to resist the tendency of the strip to flatten in response to a rise in temperature until a predetermined temperature is reached whereupon the strip abruptly changes its curvature, and a second thermostatic metal strip of united laminae having different coefficients of expansion, the said second strip being secured tangentially to the first strip with the high expanding lamina adjacent the low expanding lamina of the first strip, the said second strip having a free end whereby in response to said rise in temperature the free end of the second strip tends to move away from the first strip until the first strip abruptly reverses its curvature whereby the free end of the second strip is abruptly moved toward the first strip.

13. A thermostatic control comprising a normally flat elongated strip of thermostatic metal having a plurality of united laminae with different coefficients of expansion, a support for said strip normally flexing the same in one direction for maintaining the strip in an arched condition between points spaced from one another with the high expanding lamina on the concave side of the strip as thus flexed, said support tending to resist the tendency of the strip to flatten in response to a rise in temperature until a predetermined temperature is reached whereupon the strip abruptly changes its curvature, and a second thermostatic metal normally flat elongated strip of united laminae having different coefficients of expansion, the said second strip being secured adjacent one end to the first strip with the high expanding lamina adjacent the low expanding lamina of the first strip, the said second strip having a free end whereby in response to said rise in temperature the free end of the second strip tends to move away from the first strip until the first strip abruptly reverses its curvature whereby the free end of the second strip is abruptly moved toward the first strip.

14. A thermostatic control comprising a strip of thermostatic material consisting of a plurality of laminae having different coefficients of expansion, a support for the strip maintaining the strip arched between two spaced points, a second strip of thermostatic metal consisting of a plurality of laminae having different coefficients of expansion, said second strip being secured to said first strip and having one of its ends free, the lamina of one of said strips having the higher coefficient of expansion being positioned toward the lamina of the other strip having the lower coefficient of expansion whereby upon a change in temperature tending to reverse the curvature of the first strip the free end of the second strip tends to move away from the first strip until a predetermined temperature is reached whereupon the first strip abruptly reverses its curvature and draws the free end of the second strip toward the first strip.

15. A thermostatic control comprising a strip of thermostatic material consisting of a plurality of laminae having different coefficients of expansion, a support for the strip maintaining the strip arched between two spaced points, a second strip of thermostatic metal consisting of a plurality of laminae having different coefficients of expansion, said second strip being secured to said first strip approximately tangent to the above-mentioned arched strip at the point of securement and having one of its ends free, the lamina of one of said strips having the higher coefficient of expansion being positioned toward the lamina of the other strip having the lower coefficient of expansion whereby upon a change in temperature tending to reverse the curvature of the first strip the free end of the second strip tends to move away from the first strip until a predetermined temperature is reached whereupon the first strip abruptly reverses its curvature and draws the free end of the second strip toward the first strip.

16. A thermostatic control adapted for opening and closing an electrical circuit comprising relatively movable electrical contacts, a strip of thermostatic metal consisting of a plurality of united laminae having different coefficients of expansion, a support for the strip maintaining the strip under stress and arched between two spaced points, a second strip of thermostatic metal comprising a plurality of united laminae having different coefficients of expansion secured to said first strip and having a free end, the high expanding lamina of the one of said strips being positioned toward the low expanding lamina of the other strip, and a connection between one of said contacts and the free end of the second strip whereby upon a change in temperature tending to reverse the curvature of the first strip the free end of the second strip tends to move away from the first strip to hold the contacts together until a predetermined temperature is reached whereupon the first strip abruptly reverses its curvature and draws the free end of the second strip towards the first strip to abruptly draw the contacts apart.

17. A thermostatic control adapted for opening and closing an electrical circuit comprising relatively movable electrical contacts, a normally flat strip of thermostatic metal consisting of a plurality of united laminae having different coefficients of expansion, a support for the strip maintaining the strip under stress and arched between two spaced points, a second normally flat strip of thermostatic metal of lesser length than the first strip comprising a plurality of united laminae having different coefficients of expansion secured to said first strip and having a free end, the high expanding lamina of the one strip being positioned toward the low expanding lamina of the other strip, and a connection between one of the said contacts and the free end of the second strip whereby upon a change in temperature tending to reverse the curvature of the first strip the free end of the second strip tends to move away from the first strip to hold the contacts together until a predetermined temperature is reached whereupon the first strip abruptly reverses its curvature and draws the free end of the second strip towards the first strip to abruptly draw the contacts apart.

18. A thermostatic control comprising a strip of thermostatic metal having a plurality of united laminae with different coefficients of expansion, a support for said strip normally flexing the same in one direction for maintaining the strip in an arched condition between points spaced from one another, said support tending to resist the tendency of the strip to flatten in response to a change in temperature until a predetermined temperature is reached whereupon the strip abruptly changes its curvature, and a second thermostatic metal strip of united laminae having different coefficients of expansion, one of said strips being secured to the other of said strips with the high expanding lamina adjacent the low expanding lamina of the other strip, the said second strip having a free end whereby in response to a change in temperature tending to reverse the curvature of the first strip the free end of the second strip tends to move away from the first strip until the first strip abruptly reverses its curvature whereby the free end of the second strip is abruptly moved toward the first strip.

19. A thermostatic control comprising a strip of thermostatic metal having a plurality of united laminae with different coefficients of expansion, a support for said strip normally flexing the same in one direction for maintaining the strip in an arched condition between points spaced from one another, said support tending to resist the tendency of the strip to flatten in response to a change in temperature until a predetermined temperature is reached whereupon the strip abruptly changes its curvature, and a second thermostatic metal strip of united laminae having different coefficients of expansion, the said second strip being secured tangentially to the first strip with the high expanding lamina of the one strip adjacent the low expanding lamina of the other strip, the second strip having a free end whereby in response to a change in temperature tending to reverse the curvature of the first strip the free end of the second strip tends to move away from the first strip until the free end of the second strip is abruptly moved away from the first strip.

ROBERT A. WEINHARDT.